(12) United States Patent
Ray

(10) Patent No.: US 12,471,834 B2
(45) Date of Patent: Nov. 18, 2025

(54) INTERACTIVE ASSESSMENT SYSTEM AND METHOD OF USE

(71) Applicant: The Research Institute at Nationwide Children's Hospital, Columbus, OH (US)

(72) Inventor: William Ray, Columbus, OH (US)

(*) Notice: Subject to any disclaimer, the term of this patent is extended or adjusted under 35 U.S.C. 154(b) by 345 days.

(21) Appl. No.: 18/021,302

(22) PCT Filed: Aug. 17, 2021

(86) PCT No.: PCT/US2021/046304
§ 371 (c)(1),
(2) Date: Feb. 14, 2023

(87) PCT Pub. No.: WO2022/040182
PCT Pub. Date: Feb. 24, 2022

(65) Prior Publication Data
US 2023/0293088 A1    Sep. 21, 2023

Related U.S. Application Data

(60) Provisional application No. 63/066,900, filed on Aug. 18, 2020.

(51) Int. Cl.
*A61B 5/00*    (2006.01)
(52) U.S. Cl.
CPC .......... *A61B 5/4064* (2013.01); *A61B 5/7475* (2013.01); *A61B 2505/09* (2013.01)
(58) Field of Classification Search
CPC ................ A61B 5/4064; A61B 5/7475; A61B 2505/09; A61B 5/16
See application file for complete search history.

(56) References Cited

U.S. PATENT DOCUMENTS

| | | |
|---|---|---|
| 6,517,480 B1 | 2/2003 | Krass |
| 9,703,407 B1 | 7/2017 | Glenn et al. |
| 2012/0173049 A1 | 7/2012 | Bernstein et al. |
| 2012/0330182 A1 | 12/2012 | Alberts et al. |
| 2014/0163426 A1 | 6/2014 | Alberts et al. |
| 2014/0249447 A1 | 9/2014 | Sereno et al. |

OTHER PUBLICATIONS

International Preliminary Report on Patentability, Written Opinion of the International Searching Authority, and International Search Report, in corresponding application PCT/US2021/046304, filed Aug. 17, 2021. (12 pages).

*Primary Examiner* — Scott M. Getzow
(74) *Attorney, Agent, or Firm* — Samantha R. Smart; Watts Law, LLC

(57) ABSTRACT

An interactive assessment system for measuring neurologic function and method of use are provided herein. The interactive assessment system includes an interactive assessment device comprising an interactive display defining longitudinal and lateral columns of interactive nodes, each interactive node is coupled to a sensor, and has an illumination mode and a delumination mode. The interactive assessment system also including a processing device in communication with the interactive assessment device and configured to perform logic functions based upon user inputs on the interactive assessment device. The processing device includes memory wherein previously input interactions with the interactive assessment device are stored and tagged as successes, failure, or interaction events. The processing device provides instruction to the interactive assessment device to assign nodes to the illumination mode and the delumination mode.

20 Claims, 8 Drawing Sheets

INTERACTIVE ASSESSMENT SYSTEM AND METHOD OF USE

CROSS REFERENCE TO RELATED APPLICATIONS

The following is a U.S. national phase patent application filed under 35 U.S.C. § 371 claiming priority to international patent application serial number PCT/US21/46304 having a filing date of Aug. 17, 2021 and having been published by the International Bureau as publication number WO 2022/040182 on Feb. 24, 2022, which claims priority under 35 U.S.C. § 119 (e) to U.S. Provisional Patent Application Ser. No. 63/066,900 filed Aug. 18, 2020 entitled INTERACTIVE ASSESSMENT SYSTEM AND METHOD OF USE. The entire contents of the above-identified applications, and publication from which priority is claimed, are incorporated herein by reference in their entireties for all purposes.

TECHNICAL FIELD

The present disclosure generally relates to an assessment system and method of use, and more particularly to an assessment system for monitoring and/or measuring neurologic function, neurologic and/or muscular fatigue, and/or variation in cognitive and/or motion variables.

BACKGROUND

Many assessment, diagnostic, and therapeutic needs that involve upper-body mobility (e.g., reaching and pointing) currently use approaches that have two challenges in common: 1) existing assessments are based on "assignments", which strongly conflate volition with ability; and, 2) the existing assessments are evaluated and scored by a human expert, which requires the activity measurements to be coarse-grained (e.g. "count the successful moves"), and potentially introduces expert-to-expert subjectivity and variability in application. Typically, existing assessments are research assessments, and because of expense and complexity, these assessments have no clinical counterpart and no possibility for widespread clinical use.

For example, Cerebral Palsy (CP), the most common physical disability in the United States (US) and in the world, is poorly assessed. Many individuals with CP suffer from developmental disregard, or the inability of the brain to "see" an affected hand (e.g., neglect), which then leads to poor sensory and motor function in that hand. Similarly, neglect often affects the 800,000 adults in the US who suffer from stroke.

There are no clinical assessments that precisely quantify developmental disregard and/or neglect of an extremity. Known research assessments typically do not translate into clinical practice because they are based on subjective evaluations of behavior, and/or are not quantitative. Known research assessments often confuse cognitive ability with visuo-motor and/or tactile performance.

Current research assessments for CP require large prohibitively expensive and complex equipment. The lack of clinical assessments makes it problematic to accurately measure progress in a particular individual, which in turn makes it difficult to determine whether therapies are really helping the particular individual. Further, effective therapies for upper extremity use in CP and other like physical disabilities often involve rewiring of sensory/motor pathways in the affected hand, but also of bilateral hand movements. This is the principle of effective rehabilitation strategies such as bimanual intensive therapy. Currently effective therapies are uncoupled from effective testing.

SUMMARY

One aspect of the present disclosure comprises an interactive assessment system for measuring neurologic function and method of use are provided herein. The interactive assessment system includes an interactive assessment device comprising an interactive display defining longitudinal and lateral columns of interactive nodes, each interactive node is coupled to a sensor, and has an illumination mode and a delumination mode. The interactive assessment system also includes a processing device in communication with the interactive assessment device and configured to perform logic functions based upon user inputs on the interactive assessment device. The processing device includes memory wherein previously input interactions with the interactive assessment device are stored and tagged as successes, failure, or interaction events. The processing device provides instruction to the interactive assessment device to assign nodes to the illumination mode and the delumination mode. The processing device assigns interactive nodes as target nodes, receives one more sensor inputs from the interactive assessment device, identifies one or more interaction nodes comprising nodes that were interacted with based upon the one or more sensor inputs, matches one or more target nodes to the one or more interaction nodes, responsive to matching one or more target nodes to one or more interaction nodes, sending a success event signal and timestamping the success event signal, and responsive to failing to match one or more target nodes to one or more interaction nodes, sending a failure event signal and timestamping the failure event signal.

Another aspect of the present disclosure comprises a method of assessing neurologic function of a user, the method comprising the steps of assigning one or more interactive nodes as one or more target nodes on an interactive assessment device, the interactive assessment device comprising an interactive display comprising the one or more interactive nodes, each interactive node being coupled to a sensor, each interactive node having a first and second status indicator, the interactive assessment device comprising a processor. The method further comprises responsive to receiving one more sensor inputs to the interactive assessment device, identifying one or more interactive nodes as interaction nodes based upon the one or more sensor inputs, matching one or more target nodes to the one or more interaction nodes, and responsive to matching one or more target nodes to one or more interaction nodes, generating a timestamped success event signal. The method responsive to failing to match one or more target nodes to one or more interaction nodes, generating a timestamped failure event signal.

Another aspect of the present disclosure comprises an interactive assessment system for measuring neurologic function, the interactive assessment system comprising a first motion device coupled to a first extremity of a user, a second motion device coupled to a second extremity of a user, and an interactive display comprising a plurality of nodes arranged in longitudinal and lateral columns. The interactive assessment system further comprises a plurality of sensors coupled to each of the plurality of nodes, the plurality of sensors and plurality of nodes comprising a diode matrix that creates a lateral column signal along the lateral column and a longitudinal column signal along the longitudinal column, the column signals generated by activation of the sensors through interaction of the user with the first and second motion devices and a processing device receiving a signal responsive to the activation of one or more of the plurality of sensors, wherein the processing device stores information on the user contact with each node and instructs the plurality of nodes to present display changes based upon the stored interaction of the user.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

Figure 1:
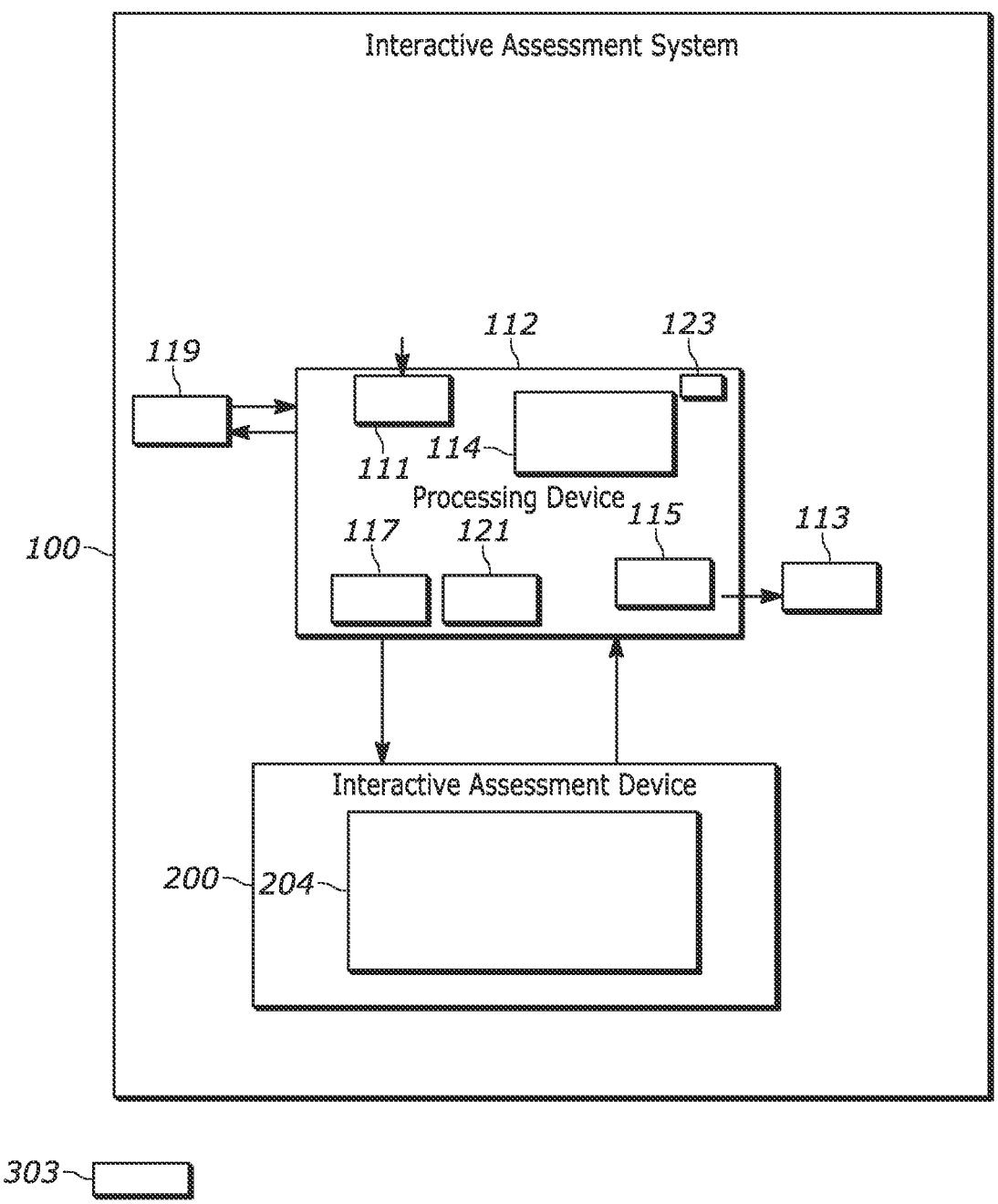
FIG. 1 is a schematic diagram of an interactive assessment system for supporting an interactive assessment device, in accordance with one example embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements throughout unless otherwise noted. The present disclosure generally relates to an assessment system and method of use, and more particularly to an assessment system for monitoring and/or measuring neurologic function, neurologic and/or muscular fatigue, and/or variation in cognitive and/or motion variables.

FIG. 1 illustrates a schematic diagram of an interactive assessment system 100, in accordance with one of the exemplary embodiments of the disclosure. The interactive system 100 includes a processing device 112, which includes a computing device 115 (e.g. a database server, a file server, an application server, a computer, or the like) with computing capability and/or a processor 114. The processor 114 comprises central processing units (CPU), such as a programmable general purpose or special purpose microprocessor, and/or other similar device or a combination thereof.

The processing device 112 would generate outputs 113 based upon inputs 111 received from an interactive assessment device 200, cloud storage, a local input from a user, etc. It would be appreciated by one having ordinary skill in the art that the processing device 112 would include a data storage device 117 in various forms of non-transitory, volatile, and non-volatile memories which would store buffered or permanent data as well as compiled programming codes used to execute functions of the processing device 112. In another example embodiment, the data storage device 117 can be external to and accessible by the processing device 112, the data storage device 117 may comprise an external hard drive, cloud storage, and/or other external recording devices 119.

In one example embodiment, the processing device 112 comprises one of a remote or local computer system 121. The computer system includes desktop, laptop, tablet handheld personal computing device, IAN, WAN, WWW, and the like, running on any number of known operating systems and are accessible for communication with remote data storage, such as a cloud, host operating computer, via a world-wide-web or Internet.

In another example embodiment, the processing device 112 comprises a processor, a microprocessor, a data storage, computer system memory that includes random-access-memory ("RAM"), read-only-memory ("ROM") and/or an input/output interface. The processing device 112 executes instructions by non-transitory computer readable medium either internal or external through the processor that communicates to the processor via input interface and/or electrical communications, such as from the interactive assessment device 200. In yet another example embodiment, the processing device 112 communicates with the Internet, a network such as a LAN, WAN, and/or a cloud, input/output devices such as flash drives, remote devices such as a smart phone or tablet, and displays. The interactive assessment device 200 includes an interactive display 204, the display for receiving tactile input. The processing device 112, an SD-card-writer (e.g., for data retrieval), and the interactive display 204 (e.g., a touch-screen status-and-control LCD display) are housed in a separate module connected by umbilical or wireless connection for communication to the processing device 112.

As illustrated in FIG. 2, the interactive assessment device 200 includes an interactive display 204 supported in a frame 202. In one example embodiment, the interactive display 204 has a smooth, tactilely unobtrusive, and/or frictionless surface. In another example embodiment, the interactive display 204 has texturing, such as bumps. In one example embodiment, the frame 202 has two lateral sides 202b coupled to two longitudinal sides 202a. In one example embodiment, the frame 202 is a square, rectangle, polygon, oval, and/or circle. The frame 202 comprises padded and/or un-padded, natural and/or synthetic materials or the like. In another example embodiment, the frame 202 comprises a low-friction and/or a non-absorbent material. One or both of the longitudinal walls 202a support one or more arm braces 206a, 206b. The one or more arm braces 206a, 206b comprises a pliable, resilient, and/or soft surface relative to a surface of the longitudinal wall 202a and/or the interactive display 204. The arm brace 206 comprises leather, synthetic leather, vinyl upholstery covering, and/or some other sanitize-able surface. In one example embodiment, the arm brace 206 comprises a foam stuffing, comprising open-cell foam padding, or the like. In one example embodiment, the interactive assessment device 200 is physically enclosed by the plexiglass and/or a laminated-MDF case. In another example embodiment, the interactive assessment device 220 is sealed to permit cleaning. In yet another example embodiment, the frame 202 is absent.

Figure 2A:
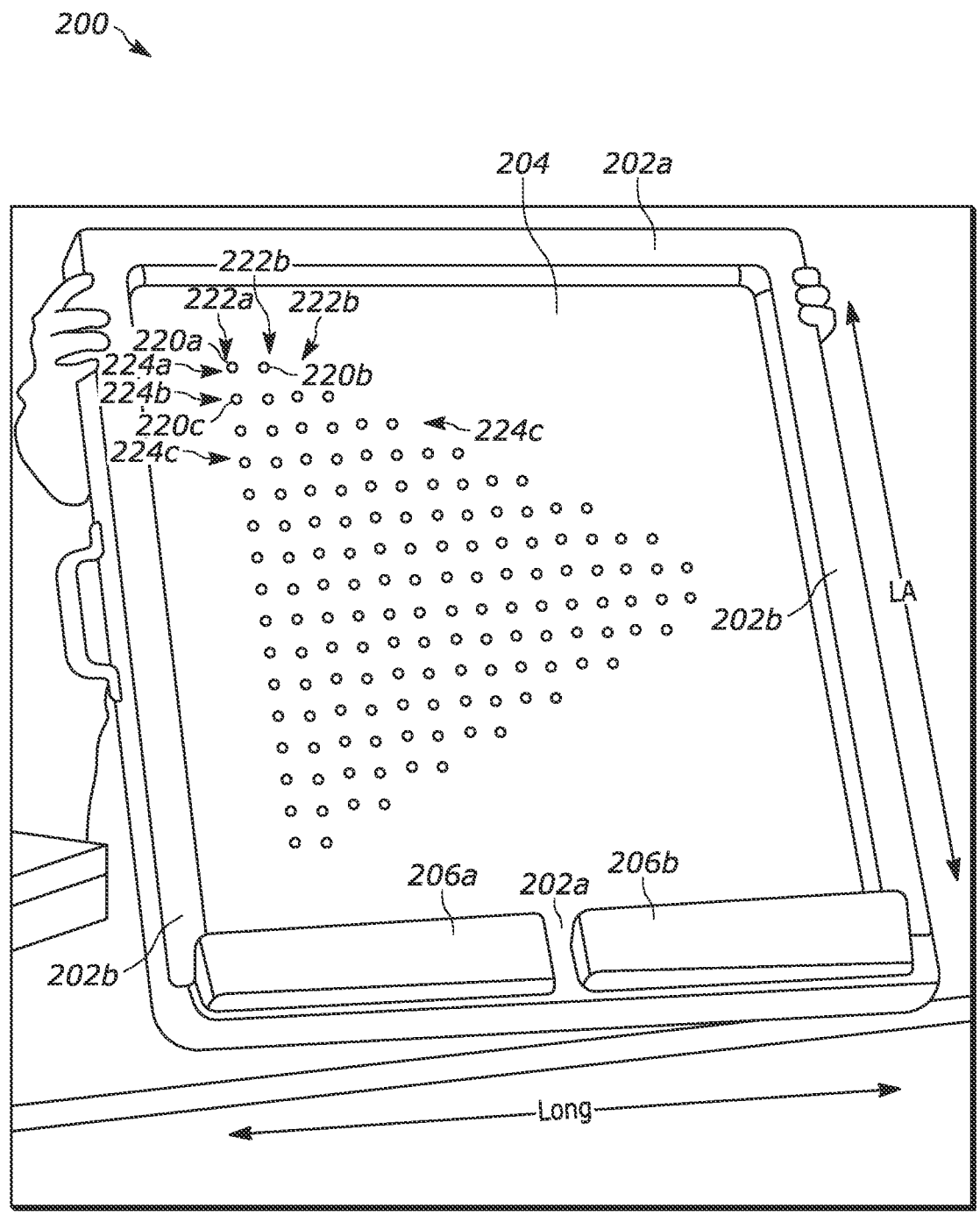
FIG. 2A illustrates a top perspective view of an interactive assessment device in accordance with one example embodiment of the present disclosure.
Figure 2B:
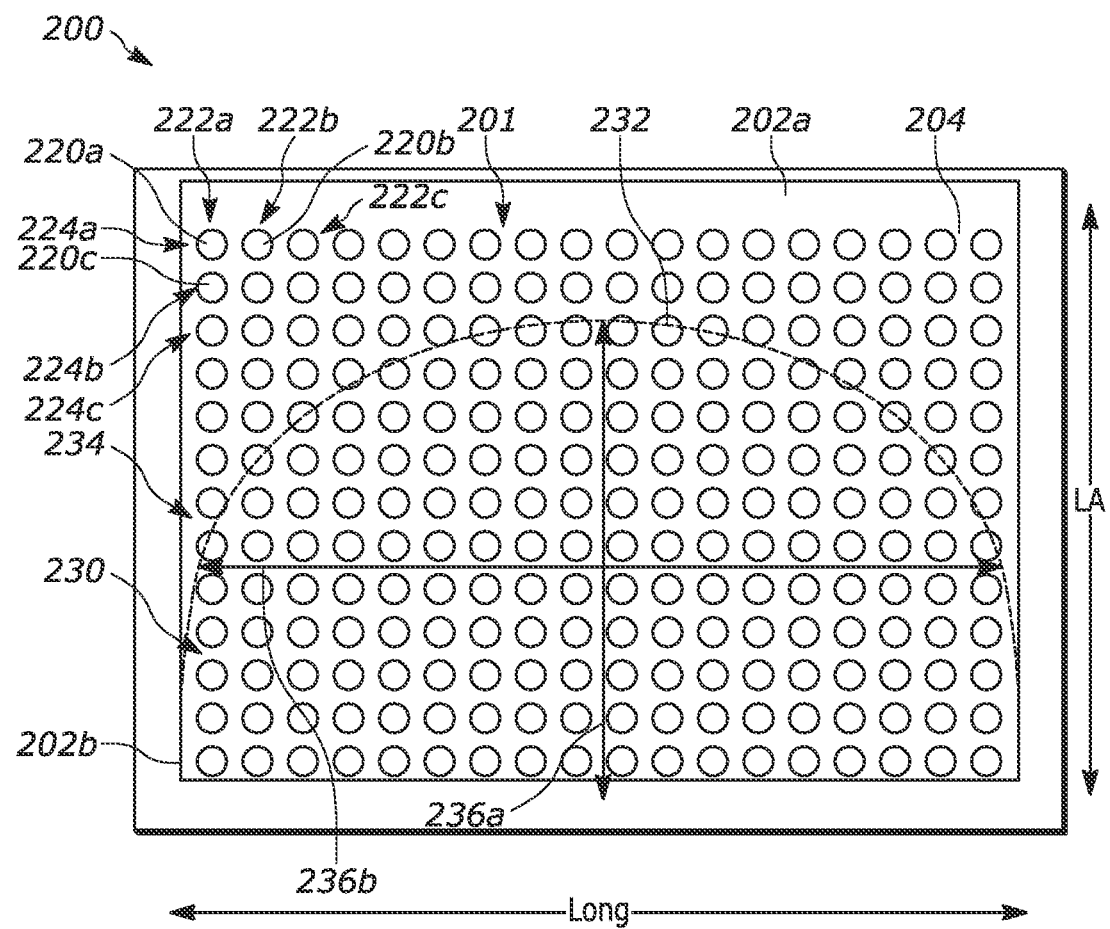
FIG. 2B illustrates a top plan view of an interactive assessment device in accordance with one example embodiment of the present disclosure
Figure 2C:
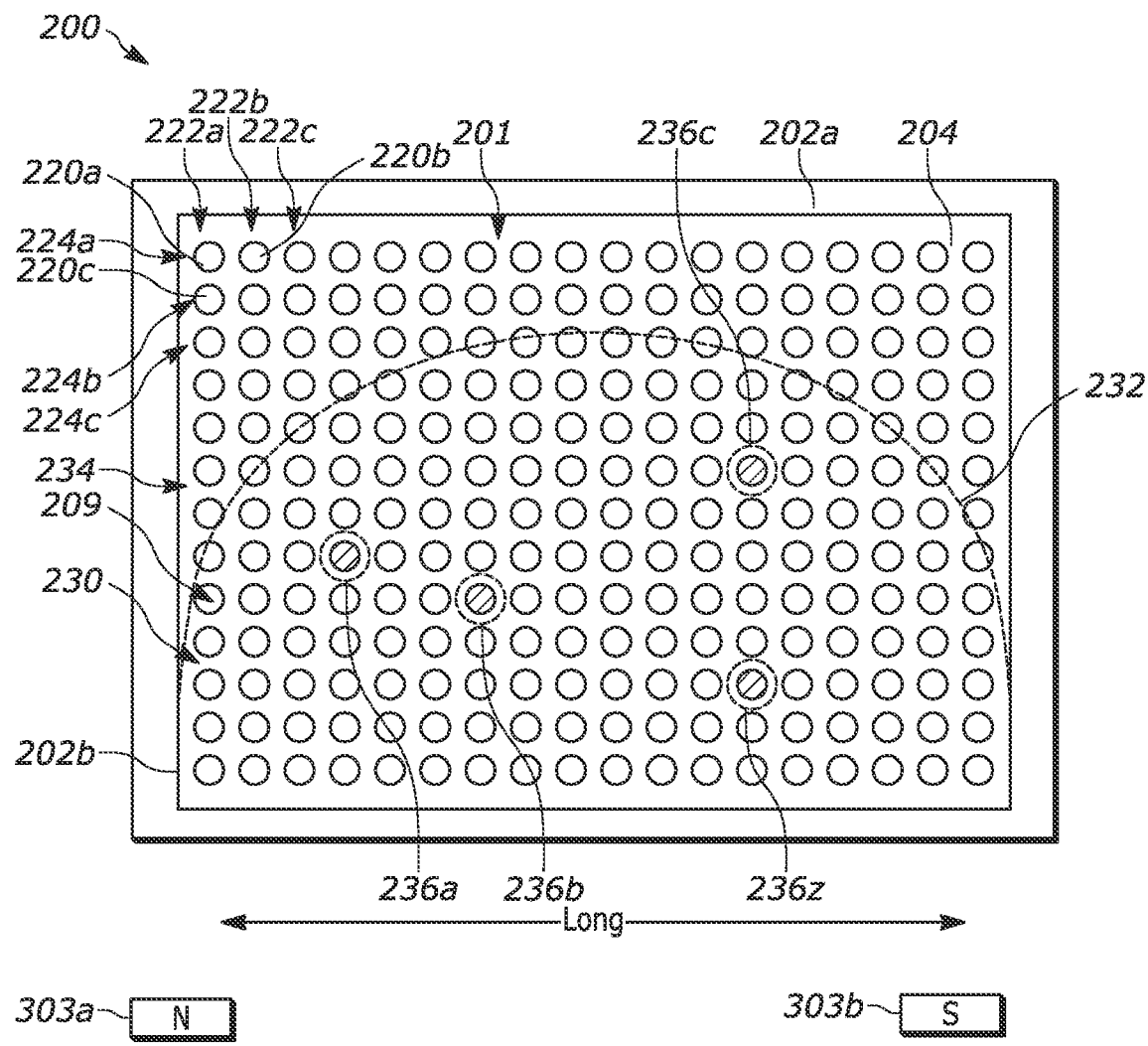
FIG. 2C illustrates a top plan view of an interactive assessment device playing a first assessment test in accordance with one example embodiment of the present disclosure.
Figure 2D:
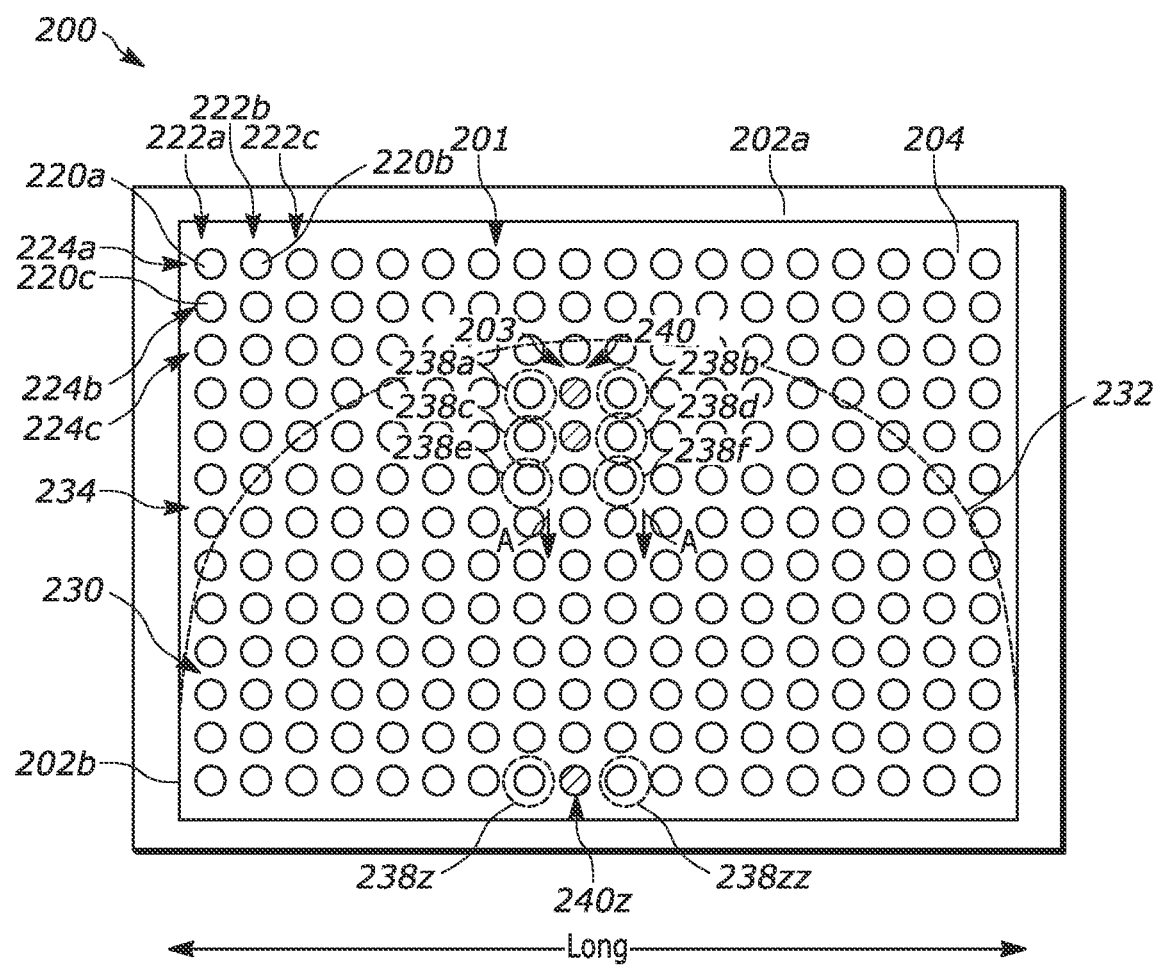
FIG. 2D illustrates a top plan view of an interactive assessment device playing a second assessment test in accordance with one example embodiment of the present disclosure.
Figure 3:
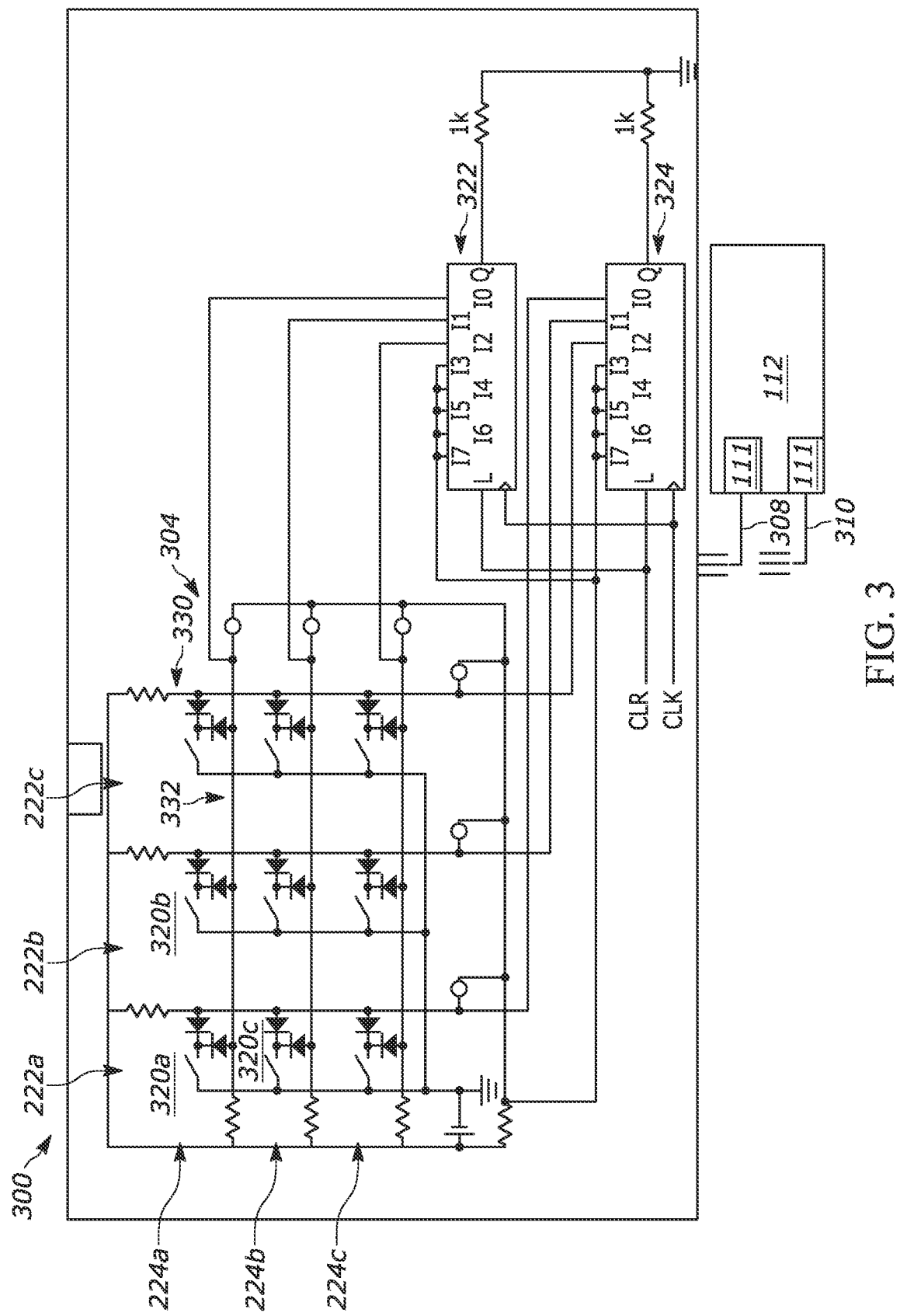
FIG. 3 illustrates a schematic view of a circuit diagram of an interactive assessment device in accordance with one example embodiment of the present disclosure.

As illustrated in FIGS. 2-3, the interactive assessment device 200 includes LCD nodes 220 (e.g. an array of individually addressable color-programmable LED lamps) supported by the interactive display 204, the LCD nodes 220 are configured and in communication with an electron circuit 300 including magnetic switches 320 (e.g., a bipolar Hall-effect sensor). In one example embodiment, the magnetic switches 320 comprise Hall-effect sensors. In another example embodiment, the LCD nodes 220 comprise color programable LED lamps.

In the illustrated example embodiment, the LCD nodes 220 are in linear lateral columns 222 along a lateral axis LA and in linear longitudinal columns 224 along a longitudinal axis LONG. In one example embodiment, a first linear lateral column 222a is perpendicular to a first linear longitudinal columns 224a, a second linear lateral column 222b is perpendicular to a second linear longitudinal columns 224b, a third linear lateral column 222c is perpendicular to a third linear longitudinal columns 224c, etc. In one example embodiment, the lateral columns 222 are parallel to the lateral walls 202b, and the longitudinal columns 224 are parallel to the longitudinal walls 202a. It would be understood by one having ordinary skill in the art that the lateral columns 222 are offset from the longitudinal columns 224.

Each LCD node 220 is coupled to and in communication with a magnetic switch 320 of the magnetic switches 320. In one example embodiment, the magnetic switches 320 function as switches that are activated by the presence of a motion device 303 for activating the magnetic switch coupled to an extremity of a patient/user. In one example embodiment of the motion device 303, bipolar versions of the magnet are used, such that a first device 303a has a north pole that is attached to a particular hand (e.g., left) and a second device 303b having a south pole that is attached to the other hand (e.g., right) to differentiate between left- and right-handed interactions with the interactive display 204. For example, a first node 220a overlays and is in communication with a first magnetic switch 320a, a second node 220b overlays and is communication with a second magnetic switch 320b, a third node 220c overlays and is communication with a third magnetic switch 320c, etc. The LCD nodes 220 and the magnetic switches 320 are in communication with the processing device 112 to provide targeted stimuli and quantitatively record patient responses. In this example embodiment, the magnetic switches 320 differentiate between north and south pole motion devices 303 based upon an output of the magnetic switches 320.

During use, the interactive display 204 illuminates a colored-light array 201 comprising the LCD nodes 220, which is created to a given patient's physical and functional measurements (discussed below in greater detail). The magnetic switches 320 open or close based upon a patient-initiated contact of the motion device 303 with the LCD node 220 coupled to the given magnetic switch 320. The opening and/or closing of the magnetic switch 320 sends a signal to the processing device 112, wherein the processing device records precise timing and bilateral information on the patient's interaction (e.g., having magnets with the appropriate polarity of the motion devices 303a, 303b affixed to a patient's left and right hands) with the colored light array created by the LCD nodes 220. The processing device 112, based upon inputs 111 received from the magnetic switches 320, generates and instructs the LCD nodes 220 to present textured audio-visual feedback 205 (see e.g., FIG. 2D) to an output 113. Stated another way, the processing device 112 generates instructions to illuminate specific LCD nodes 220 on the interactive surface 204 in a predetermined pattern, and measures using inputs received by the magnetic switches 320 the time needed for the patient to respond and "touch" with the motion device 303 (e.g., interact with the interactive surface with the appropriate polarity magnet) a given illuminated LCD node 220.

As illustrated in FIG. 3, the electronic circuit 300 includes an interactive portion 304 that underlays the interactive display 204. The magnetic switches 320 are in a same or similar configuration as the LCD nodes 220, including comprising the linear lateral columns 222 and the linear longitudinal columns 224. In one example embodiment, the electronic circuit 300 includes a diode matrix that creates both a linear lateral columns signal 330 along the linear lateral column 222 and a longitudinal lateral columns signal 332 along the linear longitudinal columns 224 from interaction with a single magnetic switch 320. The signals 330, 332 are transformed by Parallel-in-Serial-Out Shift buffers 322, 324 from a parallel signal to a serial signal that is transmitted to the input 114 of the processing device 112 as a pair of serial data streams 308, 310.

The processing device 112 of the interactive assessment device 200 includes multiple motion-and-time based assessment tests (e.g., goal oriented, and/or scored activities), such as the classic carnival Whack-A-Mole assessment test. Illustrated in FIG. 2C, is an assessment test 209 that provide clinical measurements such as reaction time, differences in motion rate or range between hands, and/or detect differences in ability to differentiate between colors (e.g., the LCD nodes 220 are instructed to emit different colors by the processing device 112, and the interactive assessment system 100 provides instructions to touch a given color with the motion device 303).

Figure 4:
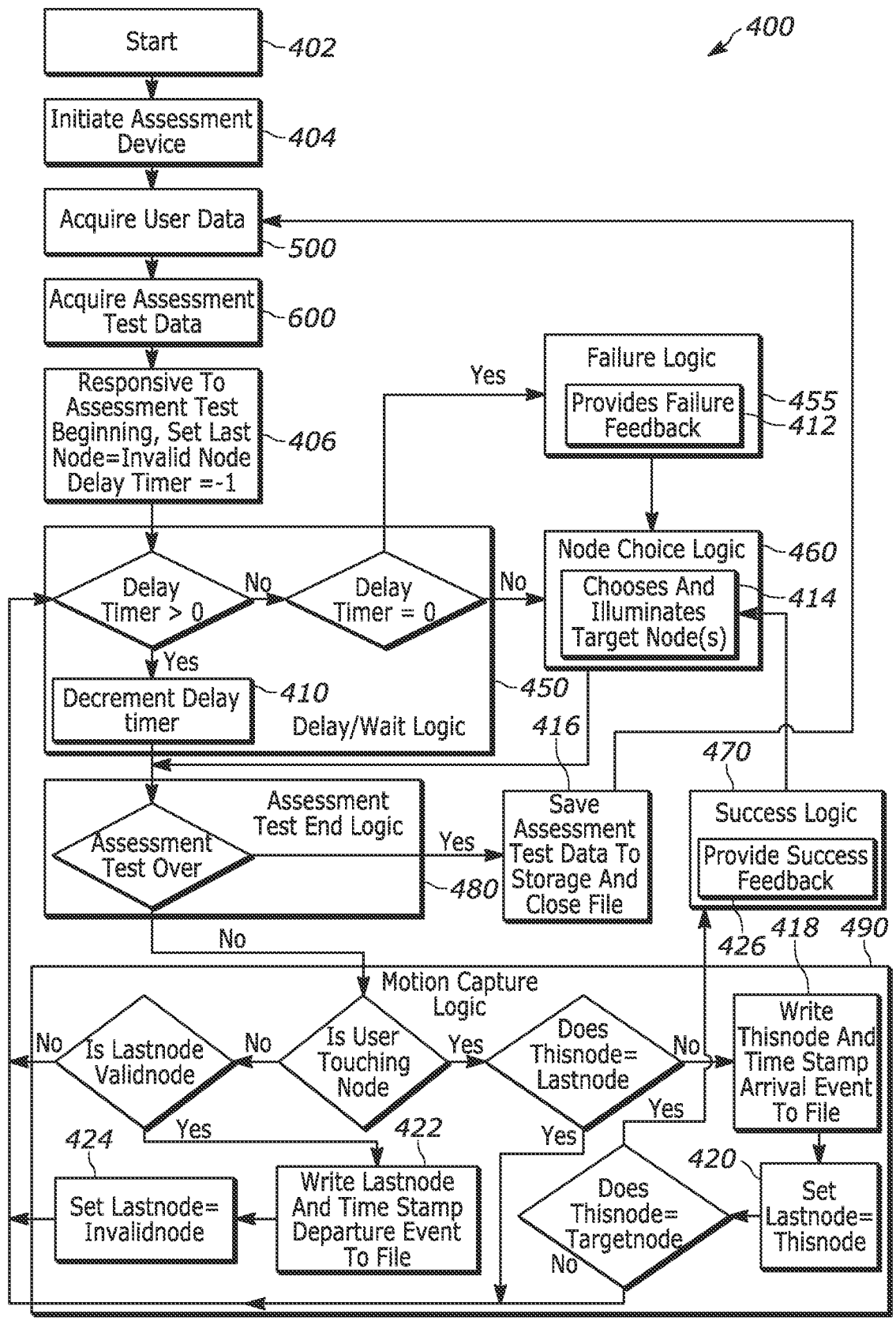
FIG. 4 illustrates a flow diagram for a method of using an interactive assessment system in accordance with one example embodiment of the present disclosure.

Illustrated in FIG. 4 is a method 400 of using the interactive assessment system 100. At 402, the method 400 starts. At 404, the interactive assessment device 200 is initiated. As discussed in more detail in FIG. 5, using the method 500, user/patient data is acquired. As discussed in more detail in FIG. 6, using the method 600, assessment test data is acquired. At 406, responsive to the assessment test beginning, a LAST_NODE of the LCD nodes 220 is set as an INVALID_NODE, and a delay timer 123 is set to −1. In other example embodiments, the delay timer 123 may be set to different increments.

After the method step 406 is accomplished, a Delay/Wait Logic 450 of the processing device 112 is utilized. In one example embodiment, the Delay/Wait Logic 450 is executed based on parameters stored in the processing device 112 and/or the like. In another example embodiment, different assessment tests and/or assessment test variants are implemented using differences in what the interactive assessment system 100 implements during a wait time (e.g., 1 second, when the delay timer 123 is set to −1).

Illustrated in FIG. 2C is the classic Whack-A-Mole assessment test, wherein a first WAM node 236*a* is illuminated, and its target node (e.g., the node the user is supposed to interact with) until the user interacts with the first WAM node, or the timer expires (causing the first WAM node to be deluminated and discontinuing a signal to the processing device that the first WAM node was interacted with). Note, a target node is designated by a grid pattern and illuminations is designated by a dashed circle around a particular node. In one example embodiment of the classic Whack-A-Mole assessment test, the interactive assessment system 100 instructs the assessment test to wait during the assigned wait time, and implementation of the assessment test occurs either when the user touches the first WAM node 236*a* (e.g., the target node), or when the target node expires. The assessment test continues as a second WAM node 236*b* is illuminated once the first WAM node 236*a* is deluminated (either because the user touched the first WAM node or the timer expired). The second WAM node 236*b* remains illuminated until the user interacts with the first WAM node, or the timer expires. The node illumination and delumination repeats iteratively with a third WAM node 236*c* and continues to a Final WAM node 236*z* when the interactive assessment system 100 determines the assessment test should cease.

The Classic Whack-A-Mole is transformable into "Air Hockey" or "Pong" (e.g, wherein a target node is any node that will interrupt a travel path of the illuminated node) by moving the target node 220 based on simple physical rules stored in the processing device 112 during the delay/wait time. Further, different clinical measures of interest are supported by assessment test variation implemented in the Delay/Wait Logic 450. For example, to measure endurance, the classical Whack-a-Mole assessment test is used, where each node 220 expires after a short period (e.g, between 0.1 seconds to 100 seconds). The user works at maximum effort, and enables measurement of changes in their speed, accuracy, etc. over the course of the assessment test. Additionally, the Delay/Wait Logic 450 will implement additional stimuli such as strobing "landing lights" with the nodes 220 directing a user's eyes to a target node, or to implement feedback or distractor displays with the nodes to make the assessment test more engaging or challenging.

At 410, responsive to the delay timer 123 being greater than 0, the delay timer 123 is decremented. In another example embodiment, responsive to the clinical question being relative speed/use of the dominant v. non-dominant hand, the Delay/Wait logic 450 does not decrement the delay timer 123, and instead leaves each WAM node 236 illuminated until the user reaches it (e.g., the processing device 112 receives an input 111 from the respective magnetic switch 320 that the user interacting with the interactive assessment device 200 with the motion device 303 has interacted with the coupled LCD node) regardless of the time it takes for the user to contact each respective WAM node.

At 412, responsive to the delay timer 123 being equal to 0, the interactive assessment system 100 implements a failure logic 455 that provides failure feedback. In one example embodiment, Failure Logic 455 implements different assessment test variants, and different clinical measures. In the example embodiment of the classical Whack-A-Mole assessment test, the assessment test ends when a certain number of WAM nodes 236 have been missed (e.g., the user failed to interact with a given WAM node after the period designated by the Delay/Wait Logic 450). For this classical Whack-A-Mole assessment test, the Failure Logic 455 accumulates the count of missed WAM nodes 236, but otherwise does not alter the Whack-A-Mole assessment test.

In one example embodiment, wherein an assessment test is designed to determine workspace 230 (e.g., a reach of the user) as illustrated in FIG. 2B, the failure logic 455 determines if the failure is at or beyond an edge 232 of the user's reachable area, and modifies the playable area (e.g., the metes and bounds of the activatable nodes 220) so that the next node the interactive assessment system 100 instructs to be illuminated is within the reachable area, which the interactive assessment system designates the workspace 230. The area outside the edge 232 of the user's reachable area is designated non-workspace area 234.

In another example embodiment, iterative failure is implemented by the Failure Logic 455 in conjunction with Delay/Wait Logic 450. In this example embodiment, iterative failure includes wherein nodes 220 are instructed to "slowly expire" (e.g., the delay timer 123 is altered to present the node as illuminated for a greater period of time) and to signal (e.g., dim, pulse, flash, etc.) to the user that the particular node(s) 220 are expiring. The slow expiration encourages the user to greater effort. In yet another embodiment, iterative failure is used as a diagnostic feature directly (e.g., in evaluating color perception). In this example embodiment, a variable node contrast is provided when the target node 220 is initially illuminated in a shade with poor contrast to the background, the Failure Logic 455 iteratively slows a change in the color of the node to increase the contrast, thereby measuring the color contrast necessary for the user to notice and respond to the node.

At 414, responsive to the delay timer 123 being less than 0, or the Failure Logic 455 having provided failure feedback, the interactive assessment system 100 implements a Node Choice Logic 460 that chooses and illuminates one or more nodes 220. For example, different assessment tests are isomorphic to "Whack-A-Mole". Whack-A-Mole presents a stimulus and waits for the user to touch a specific spot (WAM node 236) on the interactive assessment device 200 in response to that stimulus. An assessment test that involves a same play model as Whack-A-Mole, whether it involves touching a specific node or nodes 220 with the motion device 303, or avoiding a specific node or nodes, is developed using the Node Choice Logic 460 and a simple change of what nodes 220 are chosen to be illuminated by the processing device 112.

In the example embodiment illustrated in FIG. 2D, a "driving assessment test" is illustrated where the user is supposed to keep their finger coupled to the motion device 303 inside a moving path that scrolls down through the various nodes 220 on the interactive surface 204 of the interactive assessment device 200. The driving assessment test is implemented by coding the edges 238 of a path as a set of target nodes 240 and scrolling the set of target nodes along the direction indicated by arrow A on the interactive surface 204 of the interactive assessment device 200, wherein, edges 238, as designated by a dashed circle around a particular node and target nodes 240, are designated as patterned nodes. In one example embodiment, the target nodes 240 are illuminated, and edges 238 are deluminated. In another example embodiment, the edges 238 are illuminated and the target nodes 240 are deluminated.

In this example, the Delay logic 450 records a "crash" if the user touches the edge nodes 238. Illustrated in FIG. 2D is the driving assessment test, wherein leading edge nodes 238a, 238b and trailing edge nodes 238b, 238 are illuminated to highlight the target nodes 240 with which the user is supposed to interact/touch with the motion device 303. Once the user has interacted with/touched the target node 240 between the leading edge nodes 238a, 238b, or the timer expires, the edge nodes 238a, 238b deluminate, the trailing edge nodes 238c, 238d become the leading edge nodes, and the next adjacent nodes 238e, 238f along direction A become the trailing edge nodes. This process repeats iteratively and continues until final edge nodes 238z, 238zz are presented, and the final target node 240z is touched and/or until the interactive assessment system 100 determines the assessment test should cease. It would be understood by one having ordinary skill in the art that, more or less, edge nodes 238 may be illuminated at a single time, the target nodes 240 can be presented as one or more nodes, and that the path defined by the edge nodes may be linear or arced. It should be appreciated by one having ordinary skill in the art that the moving device 303 may be replaced with an interactive system device 200 that is a capacitive sense touch device.

In one example embodiment, different variations on the same assessment test, with different diagnostic insight are implemented with different Node Choice Logic 460. For example, clinical questions that use repeated evaluation of the user's performance over a fixed pattern of stimuli, are supported by Node Choice Logic 460 that draws from deterministic look-up-tables for node 220 placement. In one example embodiment, the deterministic look-up-tables are manually created by a human expert to satisfy a particular research question, algorithm derived from clinically-defined rules, and/or completely randomly. In another example embodiment, responsive to the pattern not comprising a test, (e.g., in evaluating the workspace 230) for an individual, the Node Choice Logic 460 is random, but modulated by an iteratively contracted or expanded playable area (e.g., the area wherein nodes 220 are illuminated) on the interactive assessment device 200, so as to identify the workspace 230.

At 416, responsive to the delay timer 123 being decremented, or the interactive assessment system 100 having implemented the node choice logic 460 that chooses and illuminates one or more nodes 220, and the assessment test being over, the assessment test data is saved to the storage device 117 and/or a storage component of the processing device 112, wherein user data is stored and the user's file is closed. An Assessment test End Logic 480 of the processing device 112 determines whether a particular assessment test is finished. Responsive to the clinical variable(s) of interest, the Assessment test End Logic 480 will end the assessment test after a preset duration (e.g., determined based upon user data, and/or a standard preset duration), after a certain number of nodes 220 are activated, and/or after a certain number of successes and/or failures. In one example embodiment, the preset duration, the number of nodes activated, and/or the number of successes or failures needed to end the assessment test are received by the processing device 112 from an external source. In another example embodiment, the preset duration, the number of nodes activated, and/or the number of successes or failures needed to end the assessment test is determined based on the user's data (e.g., outcomes of past assessment tests). In one example embodiment, when the Assessment test End Logic 480 determines an assessment test is over, the Assessment test End Logic instructs the interactive assessment device 100 to display an initialization stage in preparation for a new assessment test.

At 418, responsive to the delay timer 123 being decremented, or the interactive assessment system 100 having implemented the node choice logic 460 that chooses and illuminates one or more nodes 220 and responsive to the assessment test not being over, the user contacting at least one node 220 with the motion device 303, and THIS_NODE (e.g. the node the user is touching) not being equal to LAST_NODE (e.g. a node assigned as a next node of an assessment test, such as 236b, or 238c, 238d as illustrated in FIGS. 2C-2D), a Motion Capture Logic 490 of the processing device 112 writes THIS_NODE and timestamps an arrival event of THIS_NODE to the user's data. At 420, the Motion Capture Logic 490 sets the LAST_NODE as THIS_NODE.

At 422, responsive to the delay timer 123 being decremented, or the interactive assessment system 100 having implemented the node choice logic 460 that chooses and illuminates one or more nodes 220 and the assessment test not being over, the user not contacting at least one node 220 with the motion device 303, and the LAST_NODE being a VALID_NODE, the Motion Capture Logic 490 writes the LAST_NODE and timestamps a departure event of the LAST_NODE to the user's file. At 424, the Motion Capture Logic 490 sets the LAST_NODE as an INVALID_NODE. Responsive to the THIS_NODE not equaling the TARGET_NODE, the LAST_NODE not being a VALID_NODE, or performing step 424, the method 400 proceeds to the Delay/Wait Logic 450 and either method step 410, 412, or 414 based upon the status of the interactive assessment device 200.

Motion Capture Logic 490 of the processing device 112 records the timing and location of events when the user either first touches any node 220, and when the user stops touching the node. The Motion Capture Logic 490 records the magnetic pole (N or S) of the motion devices 303a, 303b that touched the node 220. For example, a north magnetic pole of the first motion device 303a will be assigned to a particular hand, and the south magnetic pole of the second motion device 303b will be assigned to the other hand, such that the Motion Capture Logic 490 records and differentiates between right and left hands. The Motion Capture Logic 490 records interactions with all nodes 220, whether a given node is illuminated 236, 238, a target node 240, or both (see FIGS. 2C-2D) or an intervening node on the interactive display 204 of the interactive assessment device 200 across which the user moves.

In one example embodiment, the method 400 includes variables tracked for two interacting hands holding respective first and second motion devices 303a, 303b. In this example embodiment, the interactive assessment device 200 records data for each magnetic pole independently (e.g. representing each hand respectively), such that relevant variable such as LAST_NODE are tracked separately and saved separately.

At 426, responsive to the setting the LAST_NODE to THIS_NODE, and THIS_NODE equaling the TARGET_NODE, a Success Logic 470 provides success feedback to the processing device 112. In one example embodiment, the Success Logic 470 provides varieties of feedback to the user, for example, deluminating the node 220, pulsing the illumination of the node, changing a color of the node, etc. to indicate success. In another example embodiment, the Success Logic 470 is implemented to support different assessment tests. In the "driving assessment test" illustrated in FIG. 2D, success in touching the motion device 303 to an illuminated node 238 is a "crash" where the user has accidentally touched the boundaries of the "road". In the "Whack-A-Mole assessment test" illustrated in FIG. 2C, success in touching the motion device 303 to an illuminated node 236 is a success. The Success Logic 470 will modify in-assessment test parameters such as the direction/velocity of the node 220 in an Air Hockey or Pong variant of the assessment test.

At 414, responsive to the Success Logic 470 providing success feedback to the processing device 112, the Node Choice Logic 460 chooses and illuminates target node(s) 220. The Assessment Test End Logic 480 then determines if the assessment test is over. For the assessment test to continue the Assessment Test End Logic 480 evaluates the relevant parameters (e.g., clinical objective, handiness, etc.) and instructs the interactive assessment device 200 to present a selected assessment test in a Delay/Wait Logic 450 to Motion Capture Logic 490 loop. Alternatively, the Assessment Test End Logic 480 instructs the interactive assessment device 200 to end the assessment test, reports and records the results of the assessment test, and returns the interactive assessment device to the initialization stage in preparation for a new assessment test.

Figure 5:
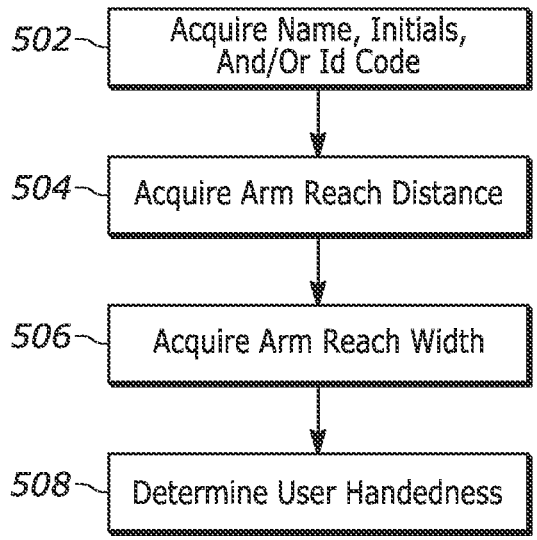
FIG. 5 illustrates a flow diagram for a method of acquiring user data for use with an interactive assessment system in accordance with one example embodiment of the present disclosure.

Illustrated in FIG. 5 is a method 500 of acquiring user data for use with the interactive assessment system 100. At 502, the interactive assessment system 100 acquires a name, initials, or an ID code for a user. In one example embodiment, the interactive assessment system 100 acquires the data from an external device, from the processing device 112, from an input 111 from remote or local computer system 121, and/or any other input received by the processing device. At 504, the interactive assessment system 100 acquires an arm reach distance of the user (e.g., a series of lateral depths 236a of the workspace 230 relative to a position along the longitudinal axis LONG, see FIG. 2B). In one example embodiment, the series of lateral depths 236a of the workspace 230 are stored with the user's data. In another example embodiment, the workspace 230 is determined through user interaction with the interactive assessment device 200. At 506, the interactive assessment system 100 acquires an arm reach width of the user (e.g., a series of longitudinal depths 236b of the workspace 230 relative to the lateral axis LA, see FIG. 2B). In one example embodiment, the series of longitudinal depths 236b of the workspace 230 are stored with the user's data. In another example embodiment, the workspace 230 is determined through user interaction with the interactive assessment device 200. The series of lateral and longitudinal depths 236a, 235b define the edge 232 of the user's reachable area.

At 508, the interactive assessment system 100 determines the handedness of the user. In one example embodiment, the handedness of the user is stored with the user's data. In one example embodiment, the handedness of the user is determined through user interaction with the interactive assessment device 200.

Figure 6:
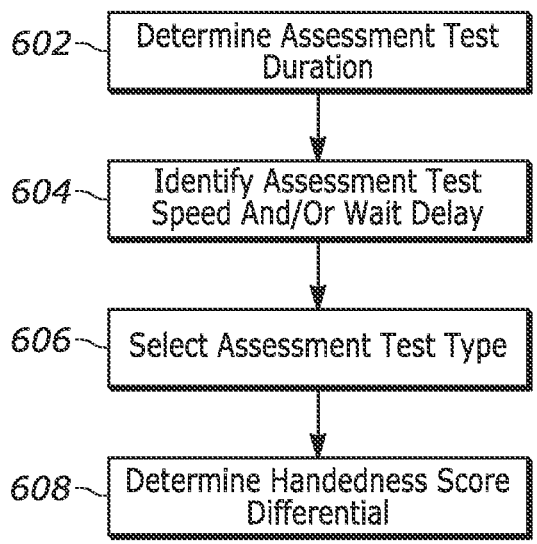
FIG. 6 illustrates a flow diagram for a method of acquiring assessment test data for use with an interactive assessment system in accordance with one example embodiment of the present disclosure.

Illustrated in FIG. 6 is a method 600 of acquiring assessment test data for use with the interactive assessment system 100. At 602, a duration of the assessment test is determined based upon the user data and the clinical objectives. At 604, an assessment test speed and/or wait delay is identified on the display 204. The assessment test speed and wait delay are determined based upon the user data and the clinical objectives, as well as the user's exhaustion point and dexterity as stored in the user's date or determined through assessment test play. At 606, an assessment test type is selected. The assessment test type selection is based upon user preference and/or clinical objectives. For example, to determine visual ability to differentiate color, an assessment test that has the nodes alter color would be selected. At 608, the handedness score differential is determined.

Because the patient has magnets that have a different polarity assigned to the left and right hand, respectively, the interactive assessment system 100 differentiates between right and left hands, while the user interaction with the interactive assessment device 200 simultaneously measure the difference in how the hands are used, at what speed, accuracy and working-area level. Because the interactive assessment system 100 distinguishes between left and right hands, assessment tests can be implemented that provide greater rewards for the use of the affected side, ensuring positive reinforcement for increasingly accurate and rapid actions. Critically, because the interactive assessment system 100 measures and reacts to a user's performance, differential reinforcement can be adaptively scaled automatically to each user, to keep the assessment test aspect of the assessment fun and engaging for any patient.

The interactive assessment system 100 reliably measures differences in speed and reaction time between the dominant and non-dominant hands of users. The interactive assessment system 100 inexpensively measures developmental disregard, and by measuring it using an interactive assessment test, simultaneously functions as an adaptive, individualized treatment method.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. In one non-limiting embodiment the terms are defined to be within for example 100%, in another possible embodiment within 5%, in another possible embodiment within 1%, and in another possible embodiment within 0.5%. The term "coupled" as used herein is defined as connected or in contact either temporarily or permanently, although not necessarily directly and not necessarily mechanically. A device or structure that is "configured" in a certain way is configured in at least that way, but may also be configured in ways that are not listed.

To the extent that the materials for any of the foregoing embodiments or components thereof are not specified, it is to be appreciated that suitable materials would be known by one of ordinary skill in the art for the intended purposes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An interactive assessment system for measuring neurologic function, the interactive assessment system comprising:
    an interactive assessment device comprising an interactive display defining at least two interactive nodes, each interactive node is coupled to a sensor, each interactive node comprises a first and second status indicator;
    a processing device in communication with the interactive assessment device, the processing device having a processor configured to perform logic functions based upon user inputs on the interactive assessment device, the processing device comprising memory wherein previously input interactions with the interactive assessment device are stored and tagged to a user identification as successes, failure, or interaction events, the processing device providing instruction to the interactive assessment device to assign nodes to an illumination mode and a delumination mode, the processing device:
    assigns interactive nodes as target nodes;
    receives one more sensor inputs from the interactive assessment device;
    identifies one or more interaction nodes comprising nodes that were interacted with based upon the one or more sensor inputs;
    matches one or more target nodes to the one or more interaction nodes;
    responsive to matching one or more target nodes to one or more interaction nodes, sending a success event signal and timestamping the success event signal; and
    responsive to failing to match one or more target nodes to one or more interaction nodes, sending a failure event signal and timestamping the failure event signal.

2. The interactive assessment system of claim 1, wherein the at least two interactive nodes comprise longitudinal and lateral columns.

3. The interactive assessment system of claim 1, the sensors comprising magnetic switches, wherein each interactive node is coupled to and overlays a magnetic switch such that the magnetic switches extend along the longitudinal and lateral columns.

4. The interactive assessment system of claim 3, wherein the magnetic switches comprise a diode matrix that creates a lateral column signal along the lateral column and a longitudinal column signal along the longitudinal column from interaction with a single magnetic switch.

5. The interactive assessment system of claim 1, wherein the first status indicator of the interactive assessment device comprises an illumination mode and the second status indicator of the interactive assessment device comprises the delumination mode.

6. The interactive assessment system of claim 1, wherein the interactive display comprises a frictionless surface.

7. The interactive assessment system of claim 1, wherein the interactive display comprises a textured surface.

8. The interactive assessment system of claim 1, wherein the sensor interacts with at least one motion device coupled to a user.

9. A method of assessing neurologic function of a user, the method comprising the steps of:
    assigning one or more interactive nodes of at least two or more nodes as one or more target nodes on an interactive assessment device, the interactive assessment device comprising an interactive display comprising the one or more interactive nodes, each interactive node being coupled to a discrete sensor, each interactive node having a first and second status indicator, the interactive assessment device comprising a processor;
    responsive to receiving one more sensor inputs to the interactive assessment device, identifying one or more interactive nodes as interaction nodes based upon the one or more sensor inputs;
    matching one or more target nodes to the one or more interaction nodes;
    responsive to matching one or more target nodes to one or more interaction nodes, generating a timestamped success event signal; and
    responsive to failing to match one or more target nodes to one or more interaction nodes, generating a timestamped failure event signal.

10. The method of claim 9, wherein the method further comprises assigning a set time period for generating the timestamped success event signal.

11. The method of claim 10, wherein responsive to failing to match one or more of the target nodes to one or more of the interactive nodes before expiration of the set time period, maintaining a display of the first and second status indicators.

12. The method of claim 10, wherein responsive to the to matching one or more of the target nodes to the one or more interactive nodes within the set time period, displaying a change between the first and second status indicators.

13. The method of claim 10, wherein responsive to failing to match one or more of the target nodes to the one or more interactive nodes at a last second of the set time period, displaying a change between the first and second status indicators.

14. The method of claim 9, the method further comprising the step of assigning a first interaction device as a first identifier and a second interaction device as a second identifier, wherein the first identifier corresponds to a first extremity of the user and the second identifier corresponds to a second extremity of the user, further wherein the first and second identifiers assess disregard or neglect of the first or second extremities of the user based on the interaction of the first and second interaction devices with the interactive assessment device.

15. The method of claim 9, the method further comprising the step of storing a location of the interaction nodes interacted with by the user.

16. The method of claim 9, wherein the plurality of interactive nodes comprise longitudinal and lateral columns.

17. An interactive assessment system for measuring neurologic function, the interactive assessment system comprising:
- a first motion device coupled to a first extremity of a user;
- a second motion device coupled to a second extremity of a user;
- an interactive display comprising a plurality of nodes arranged in longitudinal and lateral columns;
- a plurality of sensors coupled to each of the plurality of nodes, the plurality of sensors and plurality of nodes comprising a diode matrix that creates a lateral column signal along the lateral column and a longitudinal column signal along the longitudinal column, the column signals generated by activation of the sensors through interaction of the user with the first and second motion devices; and
- a processing device receiving a signal responsive to the activation of one or more of the plurality of sensors, wherein the processing device stores information on the user contact with each node and instructs the plurality of nodes to present display changes based upon the stored interaction of the user.

18. The interactive assessment system of claim 17, wherein the plurality of sensors comprise magnetic switches.

19. The interactive assessment system of claim 17, wherein the display changes comprise illumination and delumination of one or more assigned interaction nodes.

20. The interactive assessment system of claim 17, wherein the information stored by the processing device comprises left and right extremity analyses generated comprising signals received from the first and second motion devices coupled to the first and second extremities of the user and timing of said signals.

* * * * *